(No Model.)
W. S. THATCHER.
Umbrella Holder for Vehicles.
No. 235,828. Patented Dec. 21, 1880.
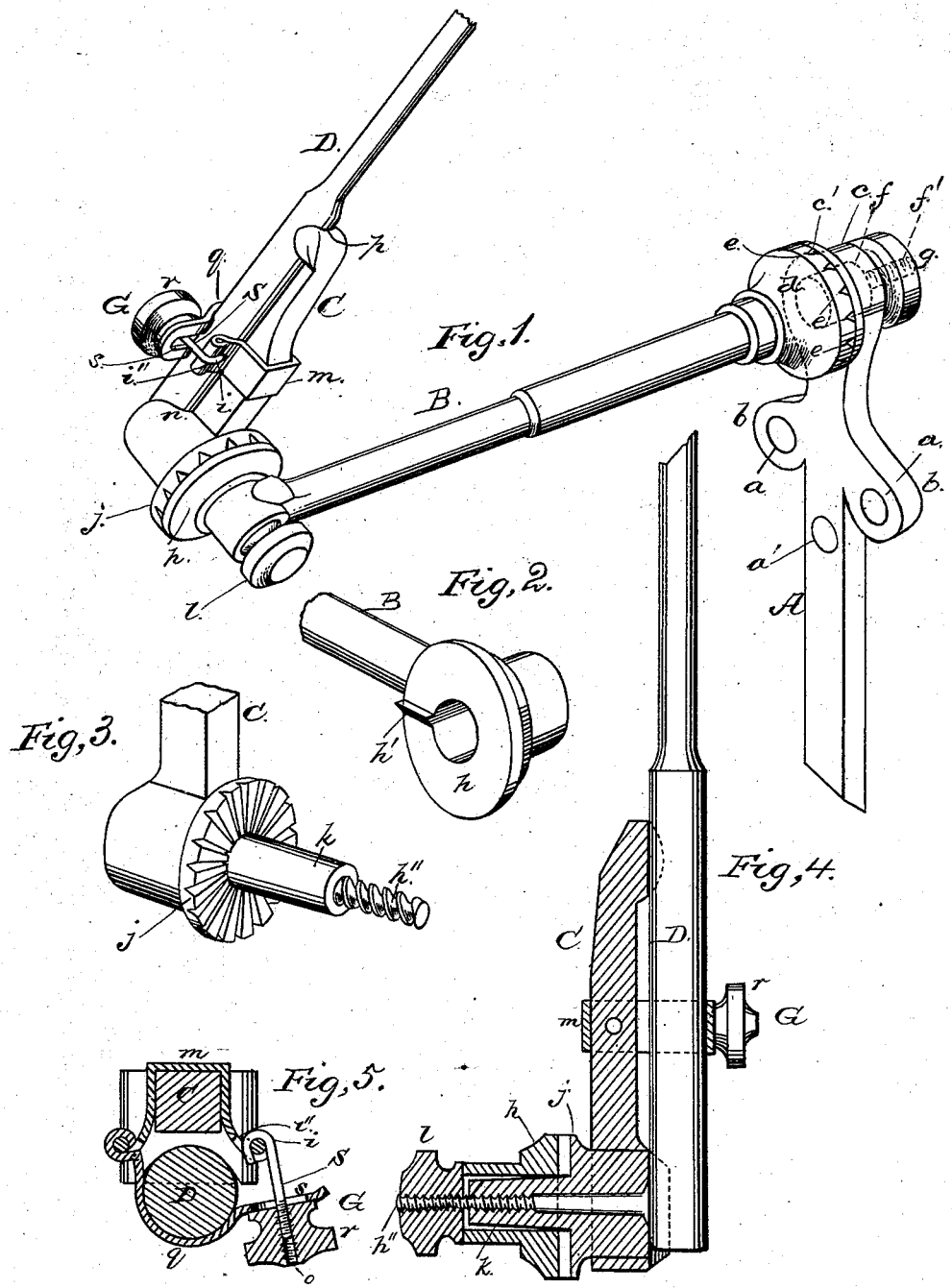

UNITED STATES PATENT OFFICE.

WALTER S. THATCHER, OF WAVERLY, NEW YORK.

UMBRELLA-HOLDER FOR VEHICLES.

SPECIFICATION forming part of Letters Patent No. 235,828, dated December 21, 1880.

Application filed May 12, 1880. (No model.)

*To all whom it may concern:*

Be it known that I, WALTER S. THATCHER, of Waverly, in the county of Tioga and State of New York, have invented a new and valuable Improvement in Umbrella-Holders for Vehicles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved umbrella-holder. Figs. 2 and 3 are perspective details, and Figs. 4 and 5 are sectional details.

This invention has relation to improvements in umbrella-holders for vehicles; and it consists in the novel arrangement and construction of the various devices used, as will be hereinafter more fully set forth.

In the annexed drawings, the letter A designates the lower branch of the holder, having perforations $a$ and $a'$ in its lateral offsets $b$ and in its lower end, respectively, by means of which it is secured to the seat, and provided at its upper end with an annular perforated bearing, $c$. This bearing has its bearing-face in a plane at right angles to the length of the branch A, and is provided with a radial tooth or rib, $c'$.

B indicates the second or horizontal branch, provided at one end with a bearing-disk, $d$, fitting snugly against the bearing-disk $c$, and provided with radial grooves $e$, in any one of which the rib $c'$ is designed to fit. The disk $d$ is provided with a journal, $f$, extending through the central opening of the bearing $c$, and provided with a screw-threaded end, $f'$, of sufficient length. Upon this screw is applied a nut, $g$, which clamps the two disks together, and which, being unscrewed, allows the branch B to be adjusted to any desired position. The branch B has upon its end an annular bearing, $h$, the axis of which is at right angles to the length thereof, and provided in its face with an angular radial rib, $h'$, in all respects like the rib $c'$ of bearing $c$.

C indicates a third or umbrella-holding branch, constructed with a radially-serrated disk, $j$, of which the axis of rotation is at right angles to the length of the said branch, and is provided at its end with a journal, $k$, terminating in a screw-threaded portion, $h''$. This journal has its bearing in the disk $h$, and its threaded part has a nut, $l$, applied thereon for the purpose of clamping the disks $j\ h$ together. The disk $h$ has in its end face a concave recess, $n$, designed to receive the butt-end portion of the umbrella-handle D and the end of the branch C a similar recess, $p$, serving as an upper bearing for the said handle, which is clamped against the said bearings by means of a clamp, G. This is composed, essentially, of a U-shaped plate, $m$, encircling the body of the branch C, and provided at one end with an eye, $i''$, and at the other end with a curved vibrating plate, $q$, which has in its end an oblong slot, $s$. The umbrella-handle is clamped against the rounded recesses $n\ p$ by means of a hook-ended screw, S, the hook $i$ of which is engaged with the eye $i''$, and its threaded portion $o$ passed through the slot $s$ of plate $q$, and a clamp-nut, $r$, applied upon the end of said screw. This arrangement of the clamp renders its use universal with every size of handle, the screw part $o$ being made long for this purpose.

What I claim as new, and desire to secure by Letters Patent, is—

The combination, with the adjustable branches of an umbrella-holder, of the clamp consisting of the U-shaped plate $m$, encircling the outer branch and having at one end an eye, $i''$, and at the other a hinged end-slotted curved plate, $q$, the hook-ended screw S, engaging said eye and extending through the slot of plate $q$, and the clamp-nut $r$, applied to the projecting end of said screw, substantially as specified.

In testimony that I claim the above I have hereunto subscribed my name in the presence of two witnesses.

WALTER S. THATCHER.

Witnesses:
PHILIP LUTZ,
EDWD. VINTON.